Feb. 6, 1923.
E. L. BOWES
ELECTRICALLY ACTUATED CAMERA SHUTTER
Filed Aug. 18, 1919
1,444,365
3 SHEETS-SHEET 1
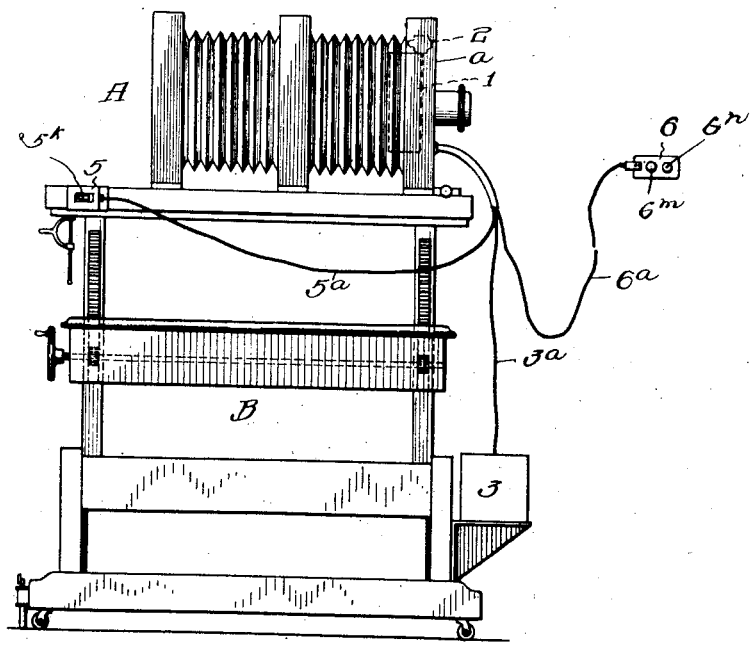
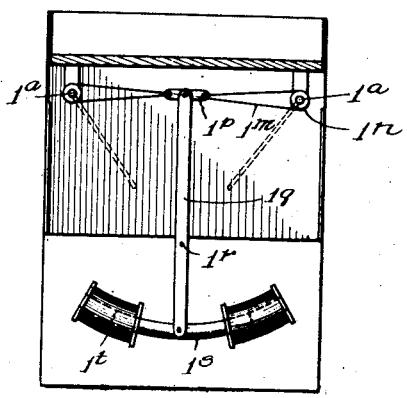
Witnesses:
R. Burkhardt
A. J. Hauser
Inventor:
Edward L. Bowes,
By Wilkinson & Huxley
Attys.

Feb. 6, 1923.
E. L. BOWES
ELECTRICALLY ACTUATED CAMERA SHUTTER
FILED AUG. 18, 1919
1,444,365
3 SHEETS-SHEET 2
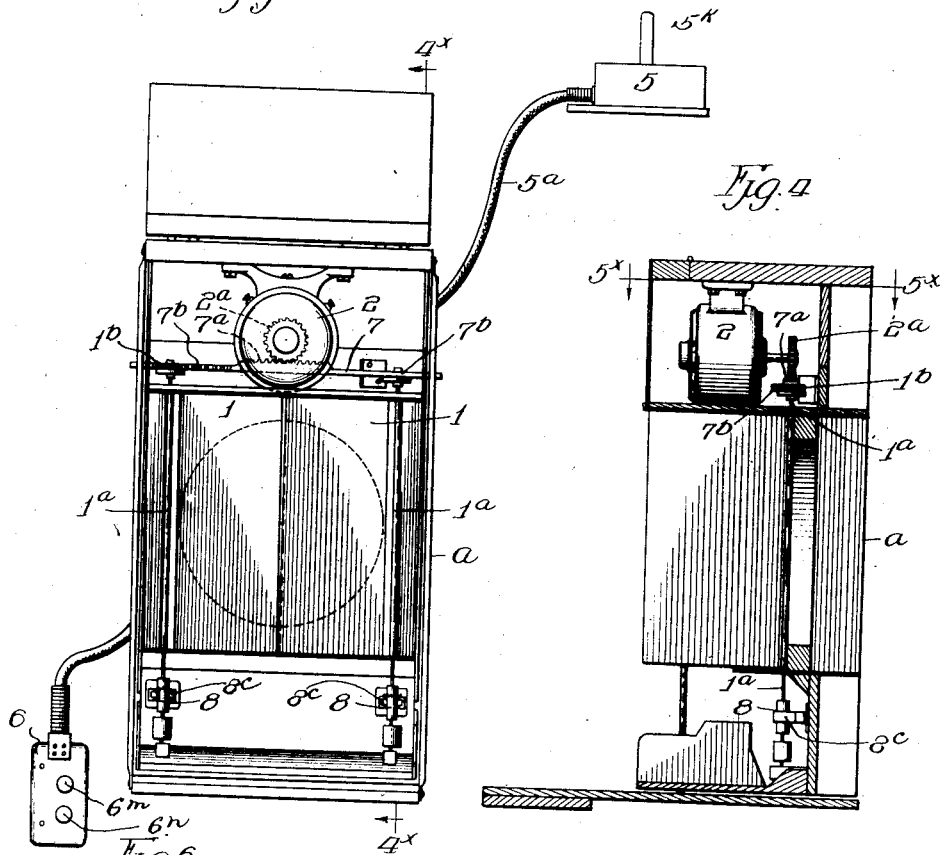
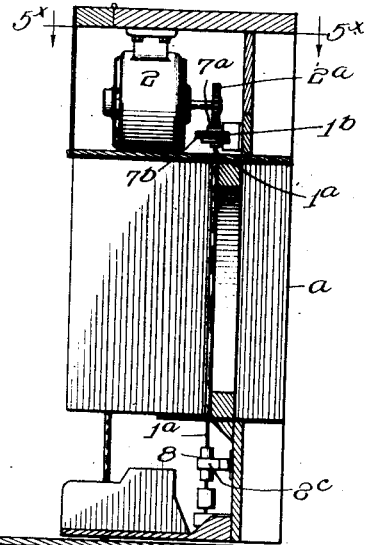
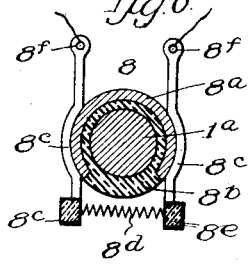
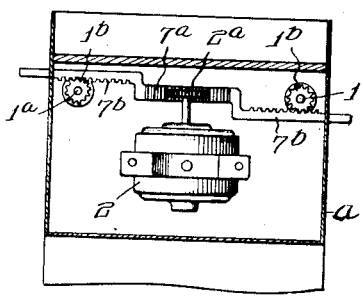
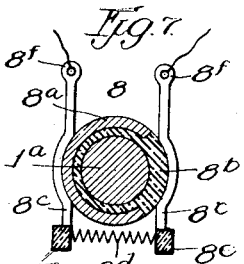

Feb. 6, 1923.
E. L. BOWES
ELECTRICALLY ACTUATED CAMERA SHUTTER
Filed Aug. 18, 1919
1,444,365
3 SHEETS-SHEET 3
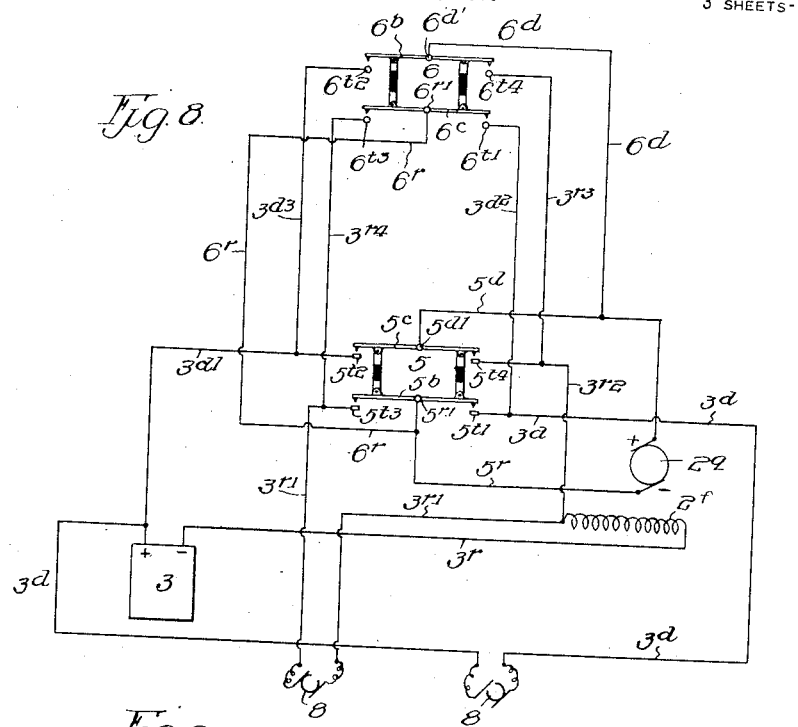
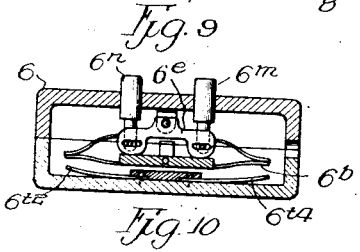
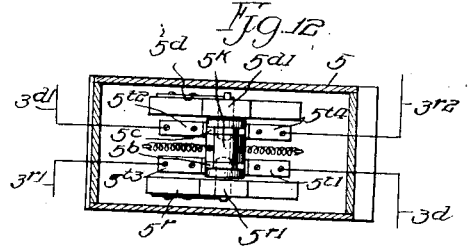
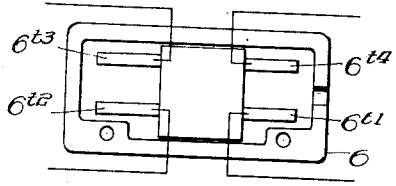
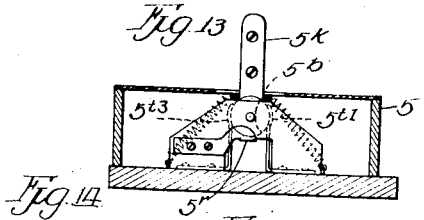
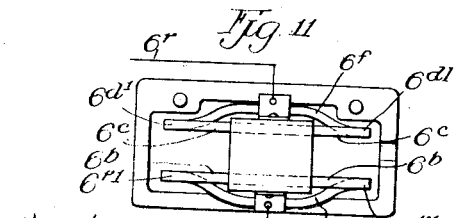
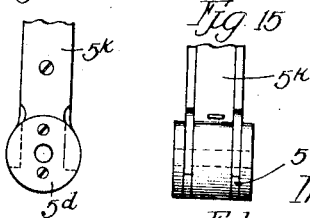
Witnesses:
K. Burkhardt
A. J. Sauser
Inventor:
Edward L. Bowes
By Wilkinson & Huxley
attys Patented Feb. 6, 1923.

1,444,365

UNITED STATES PATENT OFFICE.

EDWARD L. BOWES, OF CHICAGO, ILLINOIS.

ELECTRICALLY-ACTUATED CAMERA SHUTTER.

Application filed August 18, 1919. Serial No. 318,151.

*To all whom it may concern:*

Be it known that I, EDWARD L. BOWES, a citizen of the United States, residing at Chicago, in the county of Cook and State of Illinois, have invented certain new and useful Improvements in Electrically-Actuated Camera Shutters, of which the following is a specification.

The present invention relates to shutters for photographic cameras, and has for its object to provide a means whereby the shutter may be operated through a motive power such, for instance, as electro-motive force, that can be delivered to a shutter actuator, for instance, an electric motor from a plurality of different points remote from the shutter with the advantage of convenient control that said form of motive power affords, as well as other advantages growing out of the application of this particular form of power which will become apparent from the following description. A further object is to combine with an electric motor a form of shutter that will remain either in open or closed position without any force being required to hold it therein; to provide such a shutter with motive power that will be continuous throughout the movement of the shutter to either limit of its movement, but which will be inert so long as its application is interrupted; and also to develop a combination of such elements that will be silent in its action and free from vibration or jolting in starting or stopping. A further object is to provide controlling circuits for the motor in such an organization through which the opposite movements may be induced in the motor, and a plurality of switches (preferably two), which are individually controlled as to both circuits, and which are reciprocally acting in their relation thereto in the sense that while either switch may be used for both opening and closing either circuit, either switch may be used for inducing opening movement in the motor in either direction, and the other switch thereafter used for inducing motion in the opposite direction.

The principle of operation of the invention, as well as the general organization of its elements and the details of construction of the parts which enter into the same, will be fully understood from the following description, reference being had to the accompanying drawings, in which—

Figure 1 is a side elevation of a standard type of studio camera to which the several features of the present invention are applied by way of illustration.

Figure 2 is a plan view illustrating a modified principle of application of electromotive force in developing the opposite movements of the shutter.

Figure 3 is an elevation on an enlarged scale of the front of the camera, seen from the inside.

Figure 4 is a section on the line 4˟—4˟ of Figure 3.

Figure 5 is a section on the line 5˟—5˟ of Figure 4.

Figures 6 and 7 are detail views of two identically constructed but alternately acting circuit changers controlled by the movements of the door.

Figure 8 is a schematic view of the operating circuits.

Figure 9 is a vertical longitudinal section of a portable switch through which to control the circuits from any position which the operator may be required to assume in the use of the camera.

Figures 10 and 11 are inner face views of the respective members of the switch shown in Figure 9.

Figures 12 and 13 are, respectively, a plan view with the casing in horizontal section, and a side elevation with the casing in vertical section, of the stationary switch through which the circuits are controlled from a station near the camera; and Figures 14 and 15 are detail views of the operating lever employed in the switch shown in Figures 12 and 13.

Referring to Figure 1, A represents a camera of any approved type, and B represents a stand therefor. The primary purpose of the present invention is to operate the shutter of the camera A, for instance the swinging doors 1 mounted in its front section *a* through the medium of electro-motive force or equivalent motive power medium of a character that is adapted to be controlled from any of several points remote from the shutter, and adapted to be developed, for instance, in a motor 2 having its current supplied from any suitable source, for instance, a storage battery 3 connected therewith through the circuit $3^a$. In order to bring this motor under convenient control of the operator, its circuit is under the joint and several control of two switches, namely a switch 5 connected with the motor through circuit $5^a$ and located upon the rear portion of the camera or its stand, where it is accessible for opening and closing the shutter in the focusing operation, and a switch 6 connected with the motor through circuit $6^a$, which is portable and adapted to be carried by the operator while in attendance upon the subject to be photographed.

Referring to Figures 3 to 7, inclusive, the shutter 1 is preferably in the form of a pair of doors swinging upon vertical pintles $1^a$, each carrying at one end a pinion $1^b$ so that opposite swinging movements can be imparted to the doors; and the motor is preferably of the rotary type with a shaft pinion $2^a$ meshing with the vertically presented rack $7^a$ of a reciprocating bar 7 that has horizontally but oppositely presented racks $7^b$ that mesh with the respective door pinions $1^b$, so that driving the motor 2 in one direction will impart opposite rotation to the pintles $1^a$ in the direction to open the doors, while driving the motor in the opposite direction imparts opposite rotation to the pintles $1^a$ in the direction to close the doors. In order to automatically arrest the drive of the motor at the limit of the movement of the doors and thereby avoid jars or shocks in the camera, a circuit interrupter 8 is employed (preferably one for each direction of movement) and these interrupters are preferably mounted upon the pintles $1^a$. The construction of these interrupters will be undersood on reference to Figures 6 and 7, which show two identical interrupters, and according to which a conducting body $8^a$, mounted upon the pintle $1^a$, through the medium of an insulating sleeve $8^b$ but extending less than the circumference of the sleeve, is adapted to receive the contact arms $8^c$, having a spring $8^d$ attached to insulating blocks $8^e$ upon the ends of the arms, which swings the arms upon their pivots $8^f$ and presses them against the conductor $8^a$. Rotation of the pintles $1^a$ approximately 90° is sufficient to bring the conductor $8^a$ to one or the other of its limits, in which it either makes the circuit between the arms $8^c$ or interrupts it by receiving one of the arms upon the insulating segment $8^b$. These interrupters are connected so that one controls the opening circuit and the other the closing circuit of the motor, and are positioned, as suggested by the comparison of Figures 6 and 7, so that they operate reciprocally in opening and closing the circuits which they control. With this arrangement, throwing a switch in the direction to open the shutter, for instance, drives the motor until at the limit of the opening movement one circuit interrupter interrupts the shutter-opening circuit and the doors rest in open position. By such movement the other interrupter has shifted to the position in which it establishes closed circuit through its contacts, and as soon as the switch is thrown in the opposite direction, or in the direction to close the doors, it completes the closing circuit and the closing movement continues until the shutter attains closed position, when the closing circuit will have been interrupted by the closing interrupter and the opening circuit re-established by the opening interrupter and ready for the next opening movement of the switch.

As suggested in Figure 2, the invention is not limited to the use of a rotary motor for imparting opposite rotary movements to the pintles $1^a$. These movements may be developed through the medium of a belt $1^m$ reversed around the pulleys $1^n$ and having one of its strands connected by a yoke $1^p$ to the lever $1^q$, which is pivoted at $1^r$ and carries at its free end the core $1^s$ of the solenoids $1^t$.

The circuit arrangement employed for supplying the motor from battery 3 and controlling the supply of current through either of the switches 5 and 6 at will, is shown in Figure 8. Battery 3 has its positive wire $3^d$ and branch $3^{d1}$ presented, respectively, to the terminals $5^{t1}$ and $5^{t2}$ of the switch 5, and its branches $3^{d2}$ and $3^{d3}$ presented to the respective terminals $6^{t1}$ and $6^{t2}$ of the switch 6; while the negative wire $3^r$ leads to the field $2^f$ of the motor; also through branch $3^{r1}$ beyond the field and through one of the interrupters 8 to the terminal $5^{t3}$; also through branch $3^{r2}$ to the terminal $5^{t4}$ of the switch 5, and through branches $3^{r3}$ and $3^{r4}$ to the terminals $6^{t3}$ and $6^{t4}$ of the switch 6. Switch 5 has its respective contacts $5^b$ and $5^c$ connected through terminals $5^{d1}$, $5^{r1}$, and wires $5^d$ and $5^r$ to the respective poles of the armature $2^g$. Switch 6 has its respective contact $6^b$ and $6^c$ connected through wires $6^d$ and $6^r$ with the respective poles of the armature $2^g$, such wires $6^d$ and $6^r$ being, for convenience, tapped into the wires $5^d$ and $5^r$. Thus the arrangement is such that by throwing either end of either switch the armature is connected in series with the field and with the source of current, but the current flows in different directions through the armature according to the particular end of the switch that is thrown; and the switches become severally controlling in that either may be used alone for both opening and closing the shutter, or either may be used for throwing the shutter in one direction and the other used for throwing it in the other direction. The described circuit arrangement constitutes a simple and convenient means of establishing these conditions, but any other suitable circuit arrangement may be employed.

By referring to Figures 12 to 15, it will be seen that the switch 5 comprises a pivoted lever 5$^t$ having contact segments 5$^b$, 5$^c$ of metal, that are adapted to constantly contact with the respective terminals 5$^{d1}$, 5$^{r1}$, and which are normally out of contact with, but may be thrown into contact with, either of the terminals 5$^{t1}$, 5$^{t4}$, 5$^{t2}$, 5$^{t3}$. Since the terminals 5$^{d1}$, 5$^{r1}$ are connected, respectively, to the wires 5$^d$, 5$^r$ in the diagram of Figure 8, while the terminals 5$^{t1}$, 5$^{t4}$ are connected to the wires 3$^d$ and 3$^{r2}$ of said diagram, and the terminals 5$^{t2}$, 5$^{t3}$ are connected, respectively, to the wires 5$^{d1}$, 5$^{r1}$, the throwing of the switch lever 5$^k$ in opposite directions will effect the circuit phases disclosed schematically by the arrangement of the switch 5 and its terminals in Figure 8.

By referring to Figures 9, 10, and 11, it will be seen that the switch 6 comprises a pair of buttons 6$^m$, 6$^n$, adapted to rock a pivoted carriage 6$^e$ in opposite directions, and, through it, depress contacts 6$^b$, 6$^c$, (Figure 11) either upon the terminals 6$^{t1}$, 6$^{t4}$ (Figure 10) or upon the pair of terminals 6$^{t2}$, 6$^{t3}$; and since the contact arms 6$^b$, 6$^c$ are connected, respectively, through terminals 6$^{r1}$, 6$^{d1}$ (springs 6$^f$, 6$^g$) with the wires 6$^d$ and 6$^r$, it follows that by selecting the push button 6$^m$ or 6$^n$, switch 6, as constructed in Figures 9 to 11, may be employed for establishing the circuit phases disclosed in Figure 8.

I claim:

1. In combination with a photographic shutter, an actuator positively controlling said shutter both in the direction of opening and in the direction of closing, means supplying a motive power medium in opposite directions to said actuator, and two independent controllers for said actuator each adapted to deliver motive power medium to said actuator in either direction.

2. In combination with a photographic shutter, an actuator having opposite movements for opening and closing the same, means for supplying a motive power medium to said actuator in the respective directions to develop said movements, and two independent controllers each having a connection with said actuator through which it delivers motive power medium in the direction to open the shutter, and a connection therewith through which it supplies said medium in the direction to close the shutter.

3. In combination with a photographic shutter, an actuator positively controlling said shutter both in the direction of opening and in the direction of closing, means supplying a motive power medium in opposite directions to said actuator, and two independent controllers for said actuator each adapted to deliver motive power medium to said actuator in either direction; one of said controllers being located upon the camera within convenient reach of the operator while manipulating the camera, and the other being portable and adapted to be manipulated by the artist while in attendance upon the subject.

4. In combination with a photographic shutter, an electric motor having a driving connection with said shutter through which it positively imparts movement thereto, and an interrupter which terminates the driving action of the motor as the shutter reaches the limit of its movement.

5. In combination with a photographic shutter, an electric motor having a driving connection with said shutter through which it positively imparts movement thereto, and an interrupter which terminates the driving action of the motor as the shutter reaches the limit of its movement; said interrupter controlling the circuit through which current is supplied to the motor.

6. In combination with a photographic shutter, an electric motor having a driving connection with said shutter through which it positively imparts movement thereto, and an interrupter which terminates the driving action of the motor as the shutter reaches the limit of its movement; said interrupter being controlled by the shutter.

7. In combination with a photographic shutter, an electric motor having a driving connection with said shutter through which it positively imparts movement thereto, and an interrupter which terminates the driving action of the motor as the shutter reaches the limit of its movement; said interrupter being controlled by the shutter and adapted to control the circuit through which current is supplied to the motor.

8. In combination with a photographic shutter, an electric motor having connections through which it imparts both opening and closing movements to said shutter, an opening circuit and a closing circuit for said motor, and interrupters included in the respective circuits, each of which terminates the driving action of the motor as the shutter attains the limit of movement induced by the circuit which includes the interrupter.

9. In combination with a photographic shutter, an electric motor having connections through which it imparts both opening and closing movements to said shutter, an opening circuit and a closing circuit for said motor, and interrupters included in the respective circuits, each of which terminates the driving action of the motor as the shutter attains the limit of movement induced by the circuit which includes the interrupter; said interrupters acting reciprocally in that each closes as the other opens.

10. In combination with a photographic shutter, an electric motor having connections through which it imparts both opening and closing movements to said shutter, an opening circuit and a closing circuit for said motor, and interrupters included in the respective circuits, each of which terminates the driving action of the motor as the shutter attains the limit of movement induced by the circuit which includes the interrupter; said shutter comprising a pair of members having pivots upon which they swing; and each interrupter comprising a circuit terminal and a segment carried by the shutter pivot and cooperating with said terminal.

11. In combination with a photographic shutter, an electric motor having connections through which it imparts both opening and closing movements to said shutter, an opening circuit and a closing circuit for said motor, a rotary interrupter in each circuit, said interrupters being both moved by the opening and closing of the shutter, and each opening its circuit at the end of the shutter movement which the circuit induces, but closing its circuit when the shutter is moved by the other circuit, and a switch having selective circuit closers controlling the respective circuits.

12. In combination with a photographic shutter, comprising a pair of members, turning posts upon which said members swing, pinions through which said posts are controlled, a reciprocating bar having oppositely presented racks engaging the respective pinions and inducing opposite arcuate movements in the shutter members by each direction of movement of the bar, and an electric motor adapted to impart opposite movements to said bar.

13. In combination with a photographic shutter, comprising a pair of doors having vertical pivot posts upon which they swing and pinions on the ends of said pivot posts through which swinging movement is imparted to the doors, a rack bar having at its respective ends racks presented horizontally in opposite directions and cooperating respectively with the pinions on the pivot posts, said rack bar also having a vertically presented rack, and an electric motor having a pinion meshing with the vertically presented rack and having circuits through which opposite rotary movements are developed therein.

Signed at Waupaca, Wis., this 14th day of August, 1919.

EDWARD L. BOWES.